United States Patent [19]
Dubrovin et al.

[11] 3,808,510
[45] Apr. 30, 1974

[54] THREE-PHASE RECTIFIER CONVERTER

[76] Inventors: Mikhail Alexeevich Dubrovin, Molodezhny bulvar, 8, kv. 4; Vasily Grigorievich Davydov, Molodezhny bulvar 15, kv. 5; Valery Mikhaeilovich Bogdanov, ulitsa M.Gorkogo, 66, kv. 47; Viktor Grigorievich Kondratiev, ulitsa Lenina, 104, kv. 6, all of Tolyatti, U.S.S.R.

[22] Filed: June 5, 1972

[21] Appl. No.: 259,812

[52] U.S. Cl............................ 321/5, 321/11, 321/25
[51] Int. Cl. ............................................. H02m 7/00
[58] Field of Search ................ 321/5, 11, 12, 27, 25

[56] References Cited
UNITED STATES PATENTS
| | | | |
|---|---|---|---|
| 2,126,603 | 8/1938 | Bedford | 321/12 X |
| 2,419,464 | 4/1947 | Schmidt, Jr. | 321/2 |
| 3,349,249 | 10/1967 | Albano | 321/5 X |

FOREIGN PATENTS OR APPLICATIONS
| | | | |
|---|---|---|---|
| 176,816 | 10/1961 | Sweden | 321/25 |

Primary Examiner—William M. Shoop, Jr.
Attorney, Agent, or Firm—Holman & Stern

[57] ABSTRACT

A three-phase high voltage rectifier converter is disclosed which comprises rectifier element, three double-winding saturable reactors and a supply of transformer whose secondary windings of each phase together with two windings of different reactors connected in opposition, form series circuits, the series circuits forming a three-phase system obtained by interconnecting the end leads from the reactor windings and the rectifier elements are connected to the leads from the three-phase system in such a way that when the series circuits are arranged in a star the rectifier elements are joined to the leads from the secondary windings of the supply transformer, whereas when the series circuits are arranged in a delta whose junctions are formed by the like leads from the two windings of each of the reactors the rectifier elements are connected to the junctions of the delta.

3 Claims, 3 Drawing Figures

PATENTED APR 30 1974 3,808,510
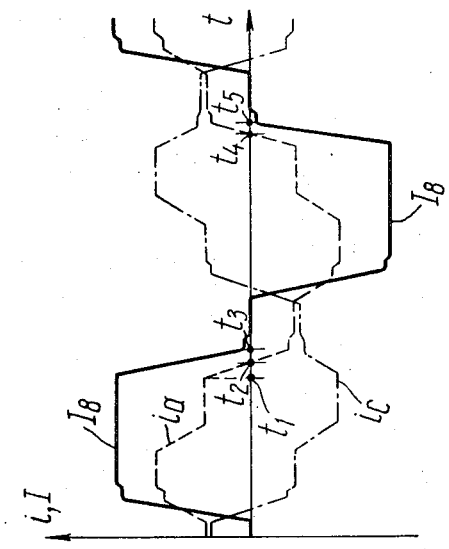
FIG.3
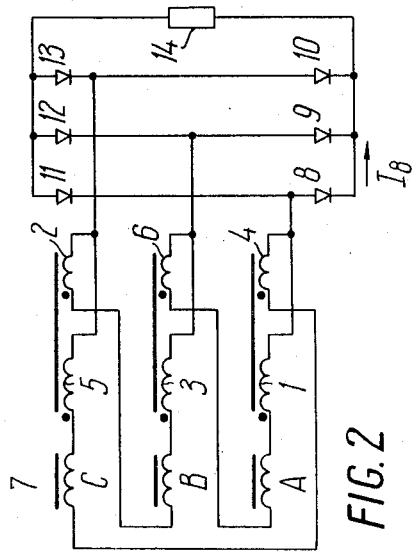
FIG.1
FIG.2

THREE-PHASE RECTIFIER CONVERTER

BACKGROUND OF THE INVENTION

The invention relates to high-voltage current converters, more particularly. to three-phase rectifier converters.

The invention can be used in converter installations of high-voltage D.C. transmission lines.

In the known rectifier converters the probability of back-firing in rectifier elements increases as the rate of rise of the inverse voltage and the rate of collapse of the current increase in the extinguishing rectifier element. The rectifier being in operation, it is important that sufficient de-ionization of plasma take place at the end of switching while the rectifier is extinguishing. If the current in the extinguishing rectifier element collapses very rapidly, the plasma will be ionized rather strongly at the moment of extinction, i.e., at the movement a reverse voltage is abruptly impressed on the rectifying element and thus back-firing is likely to occur.

Known in the prior at is a three-phase rectifier converter (cf. U.S. Pat. No. 2,126,603 or U.S. Pat. No. 2,419,464 or Swedish Pat. No. 176,816) which comprises a rectifier group supplying a transformer and three two-winding saturable reactors, the windings of each of which are connected in series with the rectifier windings of the supply transformer between the transformer and the rectifier group so that the windings of each reactor carry opposite currents of switching phases during commutation.

Therefore in the reactor of the existing rectifier converter two magnetomotive forces, opposed to each other, are operative.

The number of turns of the reactor windings is so selected that at the end of commutation the magnetomotive force of one of the windings exceeds the magnetomotive force of the other winding.

The reactor becomes re-magnetized and the self-inductance e.m.f. which appears during the re-magnetization of the reactor opposes the further collapse of the current in the extinguishing rectifier element. In this way the discharge in this rectifier element is sustained at a low current which is of the order of several percent of the full current.

Therefore, the extinguishing rectifier element will have a low current period at the end of commutation during the re-magnetisation of the reactor and, consequently, this rectifier element will have enough time for the plasma to be deionized before the inverse voltage is impressed. The risk of back-firing markedly decreases.

A disadvantage of the existing three-phase rectifier converter is that the windings of all reactors must be insulated from each other for the full line voltage of the transformer (network).

SUMMARY OF THE INVENTION

The present invention aims at obviating the above disadvantage by providing a three-phase rectifier transformer wherein the value of the voltage operative between the windings is decreased, the reliability of the reactors is improved and their size is reduced.

With this object in view in the three-phase rectifier converter described herein, which comprises rectifier elements, three double-winding saturable reactors and a supply transformer, whose secondary windings of each phase together with two windings of different reactors connected in opposition form series circuits, all three circuits being connected to form a three-phase system to the leads of which the rectifier elements are connected, according to the invention, said three-phase system is obtained by interconnecting the end leads of the reactor windings.

This is achieved by connecting the reactor windings between the rectifier windings and the neutral wire, when the rectifier windings of the transformer form a star connection, and by connecting the reactor windings at the junctions of the delta when the rectifier windings are delta-connected.

With such arrangement of the converter in both mentioned above cases, the voltage between the reactor windings is determined by the difference between the self-inductance e.m.f. of one of the windings and the mutual-inductance e.m.f. of the other winding, which fact permits the class of insulation between the windings of each reactor to be lowered, the weight and dimensions of the reactors to be reduced and thus contributes to making the three-phase rectifier converters more reliable and economical.

BRIEF DESCRIPTION OF THE DRAWINGS

The invention will be better understood from the following description of a three-phase rectifier converter, according to the invention, when read in connection with the accompanying drawings, in which:

FIG. 1 is a schematic diagram of a three-phase rectifier converter, according to the invention, with the transformer and reactor windings arranged in a star.

FIG. 2 is a schematic diagram of a three-phase rectifier converter, according to the invention, with the transformer and reactor windings arranged in a delta.

FIG. 3 shows waveforms of currents in a three-phase rectifier converter, according to FIG. 2.

DETAILED DESCRIPTION OF A PREFERRED EMBODIMENT

Referring to FIGS. 1 and 2 the three-phase rectifier converter comprises three double-winding saturable reactors with windings 1 and 2, 3 and 4, 5 and 6, respectively, a supply transformer 7 (the primary windings are not shown), a rectifier bridge which consists of rectifier elements 8, 9, 10, 11, 12, 13 and a load 14 connected to the bridge output. The reactor windings 1, 3, 5 are main or working windings, the windings 2, 4, 6 are excitation or magnetized windings.

FIG. 1 illustrates the connection of the reactor windings 1 to 6 between the rectifier or secondary windings of the supply transformer 7 and the neutral wire. The working winding 1 of one of the reactors and the magnetizing winding 6 of the second reactor are connected in series opposition with phase A. The working winding 3 of one of the reactors and the magnetizing winding 2 of another reactor are connected in series opposition with phase B. The working winding 5 of one of the reactors and the magnetizing winding 4 of another reactor are connected in series opposition with phase C, and the neutral point of the circuit is formed by the connection of the free leads of the magnetizing windings 2, 4 and 6.

FIG. 2 shows an electric circuit diagram of a rectifier converter with the rectifier or secondary windings A, B and C of the supply transformer forming a delta connection and the windings of each reactor are connected at the junctions of the delta. The working and magnetizing windings, 3 and 6 respectively, of one reactor are connected at the junction of the phases A and B; the working and magnetizing windings, 5 and 2 respectively, of the second reactor are connected at the junction between the phases B and C, and the working and magnetizing windings, 1 and 4 respectively, of the third reactor are connected at the junction of the phases C and A. Delta junctions are formed by connecting in opposition the working and magnetizing windings of each of the reactors.

The three-phase rectifier converter shown in FIG. 1 operates as follows.

From the instant the rectifier elements 8 and 13 ignite the current passes through the following circuit: the phase A of transformer 7, the rectifier element 8, the load 14, the rectifier element 13, the phase C, the main winding 5, the excitation windings 4 and 6, the main winding 1 and the phase A. This current saturates the core of the reactor with the windings 1 and 2 in the forward direction relative to the current $I_8$ of the rectifier element 8. While the current is commutated from the rectifier element 8 to the rectifier element 9, the winding 2 of the reactor is traversed by the current $I_9$ of the rectifier element 9 which sets up a magnetomotive force opposed to the magnetomotive force set up by the current $I_8$ which passes through the winding 1.

Therefore during the commutation of the rectifier elements 8 and 9 two opposed magnetic fluxes operate in the core of the reactor with the windings 1 and 2.

At the end of the commutation the magnetomotive forces of the main winding 1 and of the excitation winding 2 will be equal and thus will cancel out.

As the current $I_8$ in the main winding 1 decreases still more, the magnetomotive force set up by the excitation winding 2 exceeds the magnetomotive force of the main winding 1 and the resultant magnetomotive force in the reactor with the windings 1 and 2 becomes negative. At this instant the reactor core begins to be re-magnetized. During the re-magnetization the self-inductance e.m.f. of the reactor opposes the collapse of current in the extinguishing rectifier element 8. The discharge of the rectifier element 8 is thus sustained at a current equal to several percent of the full current of the rectifier element.

After extinction of the rectifier element 8 the reactor with the windings 1 and 2 is saturated by the current $I_9$ which passes via the rectifier element 9 through the excitation winding 2. In this way the reactor with the windings 1 and 2 is prepared for the ignition of the rectifier element 11 as the reactor core is magnetized in the direction coincident with the direction of the current in this rectifier element.

At the end of the period during which current is commutated from the rectifier element 11 to the rectifier element 12 the magnetomotive force set up by the current of the rectifier element 12 in the excitation windings 2, exceeds the magnetomotive force of the main winding 1 traversed by the current of the rectifier element 11. At this moment the reactor becomes re-magnetized again, which sustains the discharge in the extinguishing rectifier element 11. After extinction of the rectifier element 11, the core of the reactor with the windings 1 and 2 is saturated by the currents of the rectifier element 12 in the direction coincident with the direction of current in the rectifier element 8.

Operating as above the reactor with the windings 1 and 2 sustains the discharge in the rectifier elements 8 and 11 when they are extinguishing without affecting the ignition of these rectifier elements.

The reactor with the windings 3 and 4 and the reactor with the windings 5 and 6 which sustain the discharge in the rectifier elements 9, 12 and 10, 13, respectively, operate in essentially the same manner.

The turns ratio between the excitation windings 2, 4, 6 and the main windings 1, 3, 5 is so selected that the reactor core will become re-magnetized at the end of the commutation.

Operation of the three-phase rectifier converter shown in FIG. 2 is described below with respect to the reactor with the windings 1 and 4 from an instant $t_1$ (FIG. 3) when the commutation of current from the rectifier element 8 to the rectifier element 9 begins.

The operating current $I_8$ of the rectifier element 8 is determined by the difference between the phase currents $i_a$ and $i_c$ in the phases A and C which passing through the windings 1 and 4 set up the magnetomotive forces of the same sign, causing saturation of the reactor with the windings 1 and 4.

At an instant $t_2$ (FIG. 3) in the middle of the period during which current is commutated from the rectifier element 8 to the rectifier element 9, the phase current $i_a$ drops to zero and only one magnetic flux created by the phase current $i_c$ operates in the reactor core. Having passed through zero the phase current $i_a$ reverses its sign, i.e., has the same direction as the current $i_c$ and, since the windings 1 and 4 are connected in opposition, the magnetic fluxes induced in the reactor core will be also opposed to each other.

At a definite instant of time the magnetomotive forces of the main winding 1 and the excitation winding 4 of said reactor will become equal and thus cancel out.

As the phase current $i_c$ decreases still more the magnetomotive force set up by the current $i_a$ in the winding 1 exceeds the magnetomotive force of the winding 4 and the resultant magnetomotive force in the reactor with the winding 1 and 4 will become negative.

At an instant $t_3$ the said reactor becomes re-magnetized and the self-inductance e.m.f. appearing in this reactor opposes the further collapse of the current in the extinguishing rectifier element 8.

This sustains the discharge in the rectifier element 8 at a current equal to several percent of the full current.

After extinction of the rectifier element 8 the reactor with the windings 1 and 4 is saturated and therefore is prepared for the ignition of the rectifier element 11, as by this time the reactor has been re-magnetized in a direction coincident with the direction of current in the rectifier element 11.

At an instant $t_4$ which corresponds to the middle of the period during which current is commutated from the rectifier element 11 to the rectifier element 12, the phase current $i_a$ again passes through zero and its direction becomes the same as before commutation of current from the rectifier element 8 to the rectifier element 9.

Two opposed magnetic fluxes begin to operate in the core of said reactor, and the resultant magnetomotive force decreases.

At an instant $t_5$ during commutation of current from the rectifier element 11 to the rectifier element 12 the magnetomotive force of the main winding 1 first equals and then exceeds the magnetomotive force set up in the excitation winding 4 by the phase current $i_c$ and, therefore, the resultant magnetomotive force in the reactor becomes positive and the given reactor begins to be remagnetized again.

In this way the discharge is sustained in the rectifier 11.

Similar phenomena which cause the discharge in the rectifier elements to be sustained at a low current, take place in the reactors with the windings 3, 6 and 5, 2.

Each reactor successively sustains the discharge in two rectifier elements:

the reactor with the windings 1, 4, in the rectifier elements 8 and 11;

the reactor with the windings 3, 6, in the rectifier elements 9 and 12;

the reactor with the windings 5, 2, in the rectifier elements 10 and 13.

The invention described herein retains all advantages of the known devices and, besides, owing to the connection of the supply transformer and reactors windings described above, the voltage between the main and excitation windings of each reactor is determined by the difference between the self-inductance e.m.f. of the main windings and the mutual-inductance e.m.f. of the excitation windings, which fact permits the class of insulation between the windings of each reactor to be lowered, the weight and dimensions of the reactors to be reduced and thus contributes to making three-phase rectifier converters more reliable and economical.

What is claimed is:

1. A three-phase rectifier converter, comprising:

a plurality of rectifier elements disposed in each output phase of the converter;

a supply transformer including secondary windings disposed in each input phase of the converter for providing a switching current;

a saturable reactor element disposed in each input phase of the converter, each said reactor element comprising a main winding and an excitation winding; and means interconnecting the main winding of each reactor element with the excitation winding of a different reactor element in a series branch circuit with one of the respective secondary windings of said supply transformer so that during switching operation, one of the windings of one reactor element carries current of one switching phase and the other winding of said reactor element carries current of the next switching phase, the magnetic fluxes produced by the magnetomotive forces of both said windings being directed oppositely and cancelling each other when the switching current reaches approximately its maximum value, while no changes occur in the magnetization of the remaining reactor elements.

2. A three-phase rectifier converter as claimed in claim 1, wherein said interconnecting means is such that each said series branch circuit is joined to form a star-connection at a neutral point, said neutral point being formed by connecting one of the ends of each excitation winding of said reactor elements, the other ends of each excitation winding of said reactor elements being connected to one end of a different respective main winding of said reactor elements, the other ends of each respective main winding being connected to one end of the respective secondary winding, said rectifier elements being connected to the other ends of each respective secondary winding.

3. A three-phase rectifier converter as claimed in claim 1, wherein said interconnecting means is such that each said series branch circuit is joined to form a delta-connection by connecting one end of each main winding of each reactor element to one end of the excitation winding of the same reactor element defining a junction point, one end of each respective secondary winding being connected to the other end of the main windings of said reactor elements, the other end of each respective secondary winding being connected to the other end of a different respective excitation winding of said reactor elements, said rectifier elements being connected to each said junction point of the delta-connection.

* * * * *